United States Patent
Mizuno et al.

(10) Patent No.: US 10,500,939 B2
(45) Date of Patent: Dec. 10, 2019

(54) VEHICLE WITH CAPSULE STRUCTURE OF POWER UNIT

(71) Applicant: SUBARU CORPORATION, Tokyo (JP)

(72) Inventors: Takako Mizuno, Tokyo (JP); Kensaku Tanaka, Tokyo (JP); Yoshio Iwakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/030,991

(22) Filed: Jul. 10, 2018

(65) Prior Publication Data

US 2019/0100093 A1    Apr. 4, 2019

(30) Foreign Application Priority Data

Sep. 29, 2017 (JP) ................. 2017-189311

(51) Int. Cl.
*B60K 6/405* (2007.10)
*B60H 1/00* (2006.01)
*B60K 1/00* (2006.01)

(52) U.S. Cl.
CPC ......... *B60K 6/405* (2013.01); *B60H 1/00278* (2013.01); *B60K 1/00* (2013.01);
(Continued)

(58) Field of Classification Search
CPC .... B60K 6/405; B60K 1/00; B60K 2001/008; B60H 1/00278; B60Y 2200/92; B60Y 2410/10
See application file for complete search history.

(56) References Cited

U.S. PATENT DOCUMENTS 3,882,951 A * 5/1975 Conley ............... B60K 5/10
                                                    123/198 E
4,445,584 A * 5/1984 Kimura ............ B60R 13/0861
                                                    180/69.1
(Continued)

FOREIGN PATENT DOCUMENTS

JP    09-130917 A    5/1997
JP    2013-119384 A  6/2013
(Continued)

OTHER PUBLICATIONS

Notification of reason(s) for refusal issued in corresponding Japanese Patent Application No. 2017-1893311 dated Feb. 12, 2019.
(Continued)

*Primary Examiner* — Erez Gurari
(74) *Attorney, Agent, or Firm* — Troutman Sanders LLP

(57) ABSTRACT

A vehicle with a capsule structure of a power unit is provided. The power unit includes an internal combustion engine configured to combust air-fuel mixture in an engine body and output a driving force, and a motor configured to output a driving force by using electric power of an electric generator or a battery. At least the engine body is enclosed by the capsule structure, and at least the battery is disposed behind the capsule structure. The capsule structure includes an exhaust opening provided in a back part of the capsule structure, an exhaust open-close member configured to open and close the exhaust opening to discharge and stop discharging air from the exhaust opening, and a controller configured to control the exhaust open-close member to open and close the exhaust opening.

18 Claims, 5 Drawing Sheets

(52) U.S. Cl.
CPC ..... *B60K 2001/008* (2013.01); *B60Y 2200/92* (2013.01); *B60Y 2410/10* (2013.01)

(56) References Cited

U.S. PATENT DOCUMENTS

| | | | |
|---|---|---|---|
| 4,610,326 A * | 9/1986 | Kirchweger | B60K 11/08 123/41.62 |
| 6,854,544 B2 * | 2/2005 | Vide | B60K 11/085 180/68.1 |
| 8,752,660 B2 * | 6/2014 | Ajisaka | B60K 11/04 180/291 |
| 10,214,159 B1 * | 2/2019 | An | B60R 13/0884 |
| 10,214,876 B2 * | 2/2019 | Nakagawa | B60K 11/04 |
| 2013/0146376 A1 * | 6/2013 | Nam | B60K 11/06 180/68.1 |
| 2016/0347198 A1 * | 12/2016 | Garfinkel | B60L 11/1874 |

FOREIGN PATENT DOCUMENTS

| | | |
|---|---|---|
| JP | 2013-180614 A | 9/2013 |
| JP | 2016-002863 A | 1/2016 |
| JP | 2017-13638 A | 1/2017 |

OTHER PUBLICATIONS

Notification of reason(s) for refusal issued in corresponding Japanese Patent Application No. 2017-189311 dated Apr. 23, 2019.

* cited by examiner

VEHICLE WITH CAPSULE STRUCTURE OF POWER UNIT

CROSS-REFERENCE TO RELATED APPLICATIONS

The present application claims priority from Japanese Patent Application No. 2017-189311 filed on Sep. 29, 2017, the entire contents of which are hereby incorporated by reference.

BACKGROUND

1. Technical Field

The present invention relates to a vehicle with a capsule structure of a power unit such as an internal-combustion engine and a motor.

2. Related Art

In the automobile industry, an electric automobile using a power unit including a battery and a motor has been developing in recent years. Realizing the practical use of the electric automobile depends on the progress of development. Therefore, now and in the near future, it is hard to imagine that an internal-combustion engine for combusting air-fuel mixture in an engine body is no longer in use in an automobile such as a hybrid automobile.

The internal-combustion engine that outputs a driving force by combusting air-fuel mixture in an engine body has been required to improve the fuel economy performance. To address this, it has been proposed that an engine body is covered by a capsule structure, for example, in Japanese Unexamined Patent Application Publication (JP-A) No. 2013-119384. Here, the controller controls the front inlet of the capsule structure to close in initial start or a Key-Off state, and to open in the cooled state when the vehicle is driven. This closed capsule structure can keep the temperature of the engine body for a long time while the engine is stopped, and after that, the engine body which is kept warm can be restarted. The engine body is kept warm and restarted, and therefore it is possible to improve the fuel economy performance compared to when the cooled engine body is restarted. Meanwhile, in the case of a motor using electric power of an electric generator or a battery to output a driving force, if the temperature of the motor or the battery is low, the output of the battery is reduced, and therefore the cruising range may decrease.

It is desirable to provide a vehicle with a capsule structure of a power unit capable of improving the performance of the power unit in practical use.

SUMMARY OF THE INVENTION

An aspect of the present invention provides a vehicle with a capsule structure of a power unit including an internal combustion engine configured to combust air-fuel mixture in an engine body and output a driving force, and a motor configured to output a driving force by using electric power of an electric generator or a battery. At least the engine body is enclosed by the capsule structure, and at least the battery is disposed behind the capsule structure. The capsule structure includes an exhaust opening provided in a back part of the capsule structure, an exhaust open-close member configured to open and close the exhaust opening to discharge and stop discharging air from the exhaust opening, and a controller configured to control the exhaust open-close member to open and close the exhaust opening.

An aspect of the present invention provides a vehicle with a capsule structure of a power unit including an internal combustion engine configured to combust air-fuel mixture in an engine body and output a driving force, and a motor configured to output a driving force by using electric power of an electric generator or a battery. At least the engine body is enclosed by the capsule structure, and at least the battery is disposed behind the capsule structure. The capsule structure includes an exhaust opening provided in a back part of the capsule structure, an exhaust open-close member configured to open and close the exhaust opening to discharge and stop discharging air from the exhaust opening, and circuitry configured to control the exhaust open-close member to open and close the exhaust opening.

DETAILED DESCRIPTION

Figure 1A:
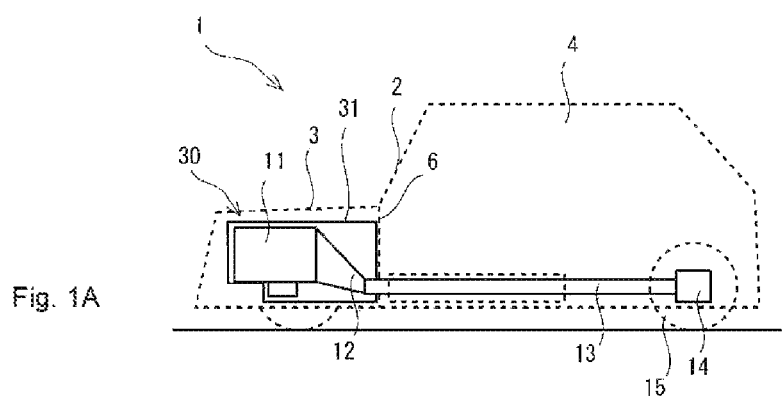
FIGS. 1A-1B illustrates a vehicle according to an example of the present invention.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 1B:
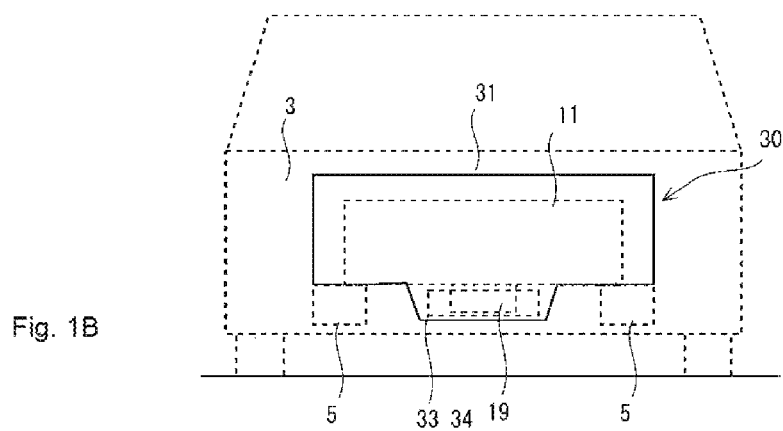

FIGS. 1A-1B illustrate an automobile 1 according to an example of the present invention. The automobile 1 is an example of vehicles. FIG. 1A is a schematic side perspective view illustrating the automobile 1. FIG. 1B is a schematic front perspective view illustrating the automobile 1.

The automobile 1 illustrated in FIGS. 1A-1B includes a vehicle body 2. A front compartment 3 is provided in the front part of the vehicle body 2. A pair of front beams 5, as a framework member of the automobile 1, extends in the front compartment 3. In addition, a toe board 6, as a partition wall (structural member), is provided between the front compartment 3 and a passenger compartment 4. A power unit including an engine body 11, a transmission 12, and so forth is disposed in the front compartment 3. In addition, a propeller shaft 13 is provided under the floor of the vehicle body 2 to extend from the front compartment 3 to the back of the vehicle body 2. A rear differential gearbox 14 is provided at the rear end of the propeller shaft 13 and coupled to a rear wheel 15 (axle). The engine body 11 ignites and combusts air-fuel mixture of gasoline and the air introduced through an air cleaner 16 and an induction pipe 17 in a combustion chamber, moves a piston down with an expanding pressure of the combusted air-fuel mixture, and rotates an output axis coupled to the piston. In addition, the combusted air-fuel mixture is discharged to the outside through an open exhaust valve and an exhaust pipe 18. A rotary drive force of the output shaft generated by the engine body 11 is reduced by the transmission 12, and transmitted to the rear wheel 15 through the propeller shaft 13, the rear differential gearbox 14, and a rear axle shaft. Then, part of the rotary drive force is divided by the transmission 12, and transmitted to a front wheel 15 through a front axle shaft (not illustrated).

In the automobile industry, an electric automobile using a power unit including a battery and a motor has been developing in recent years. Realizing the practical use of the electric automobile depends on the progress of development. Therefore, now and in the near future, it is hard to imagine that an internal-combustion engine for combusting air-fuel mixture in the engine body 11 is no longer in use in the automobile 1 such as a hybrid automobile. The internal-combustion engine that combusts air-fuel mixture in the engine body 11 will be required to improve the fuel economy performance in the future. Also, the power unit including the engine body 11 is required to improve the fuel economy performance in practical use.

Figure 2:
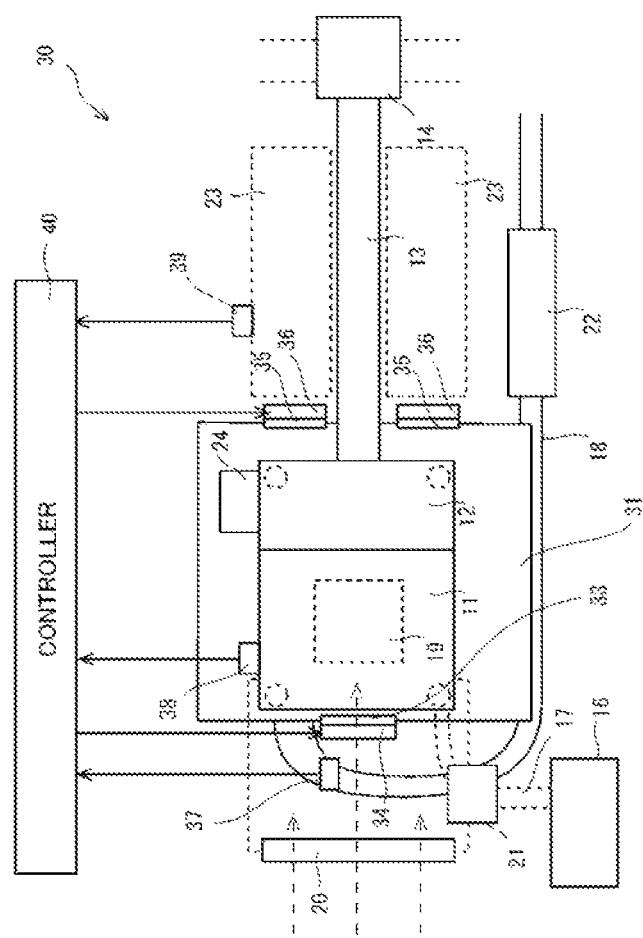
FIG. 2 illustrates a power unit and a capsule apparatus provided in the vehicle illustrated in FIGS. 1A-1B.

FIG. 2 illustrates a power unit and a capsule apparatus 30 provided in the automobile 1 illustrated in FIGS. 1A-1B.

FIG. 2 illustrates the internal combustion engine as a power unit provided in automobile 1, which includes the engine body 11, an oil pan 19, a radiator 20, the air cleaner 16, the induction pipe 17, the exhaust pipe 18, a turbomachinery 21, a catalytic machinery 22, the transmission 12, the propeller shaft 13, and the rear differential gearbox 14. The oil pan 19 formed integrally with the engine body 11 protrudes under the engine body 11. The engine body 11 and the transmission 12 are lubricated with oil. The radiator 20, the air cleaner 16, the induction pipe 17, the exhaust pipe 18, the turbomachinery 21, and the catalytic machinery 22 are engine accessories for use with the engine body 11. In addition, engine accessories include, for example, an electric generator, a battery, a distributor, an injector, a fuel tank, and a pump (not illustrated). These engine accessories are used with the engine body 11 to assist the operation of the engine body 11 to maintain the state of the engine body 11 within an appropriate range for the combustion. Moreover, FIG. 2 illustrates an electric drive power unit including battery modules 23 and the motor 24 provided in the automobile 1. In addition, the electric drive power unit may include an electric generator and so forth. The battery modules 23 are provided under the floor of the passenger compartment 4 on each side of a tunnel accommodating the propeller shaft 13 in the width direction of the automobile 1. Each of the battery modules 23 includes a plurality of battery cells, an inverter, a cooling circuit and so forth. The motor 24 is operated by using the electric power accumulated in the battery modules 23, and the electric power generated by the electric generator. The motor 24 is formed integrally with the transmission 12 to transmit the driving force from the transmission 12 to the driving system.

Moreover, FIG. 2 illustrates the capsule apparatus 30 configured to enclose the power unit including, for example, the engine body 11. FIGS. 3A-3D illustrate the opening and closing state of the capsule apparatus 30 illustrated in FIG. 2. The capsule apparatus 30 includes a casing 31, an intake opening 33, an intake open-close member 34, an exhaust opening 35, an exhaust open-close member 36, an external temperature sensor 37, an internal temperature sensor 38, a battery temperature sensor 39, and a controller 40.

The casing 31 has an approximately boxy shape, and encloses the engine body 11 integrally formed with the oil pan 19 and the transmission 12 of the power unit. The casing 31 is made of, for example, a heat insulating material. The casing 31 has a box shape which is one size larger than a size to accommodate the engine body 11 and the transmission 12. In order to secure the seal of the casing 31, a boot (not illustrated) which is made of, for example, a rubber material or a resin material, is provided around the propeller shaft 13, the induction pipe 17, and the exhaust pipe 18 protruding outward from the casing 31. By this means, the casing 31 hermetically encloses the engine body 11 and the transmission 12 while providing an air layer around the engine body 11 and the transmission 12. The casing 31 also encloses the injector and the oil pan 19 provided in the engine body 11. Components lubricated with oil can be accommodated in the casing 31. Meanwhile, approximately the entire exhaust pipe 18, the turbomachinery 21, the catalytic machinery 22, the air cleaner 16, and approximately the entire induction pipe 17 are provided outside the casing 31. By this means, it is possible to prevent the combusted air-fuel mixture discharged from the exhaust system, which has a high temperature, from staying in the casing 31. Here, the engine accessories such as the electric generator, the battery, the distributor, the fuel tank, and the pump may be provided inside or outside the casing 31. As illustrated in FIGS. 1A-1B, the casing 31 is disposed in the front compartment 3 where the engine body 11 is placed on the casing 31, and the casing 31 and the engine body 11 are mounted to and supported by the pair of front beams 5 of the vehicle body 2 at the same positions. As illustrated in FIG. 1B, the casing 31 is provided not to protrude downward from the pair of front beams 5. By this means, the minimum ground clearance of the vehicle body 2 is the same as that when the casing 31 is not provided.

As illustrated in FIGS. 3A-3D, the intake opening 33 is formed in the front surface of the casing 31. By this means, the outside air blows against the front of the vehicle body 2 when the automobile 1 moves.

Figure 3A:
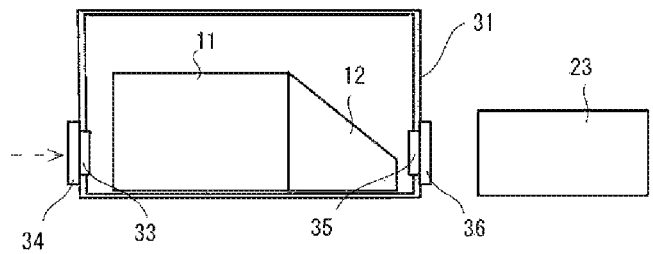
FIGS. 3A-3D illustrate the opening and closing state of the capsule apparatus illustrated in FIG. 2.
Figure 3B:
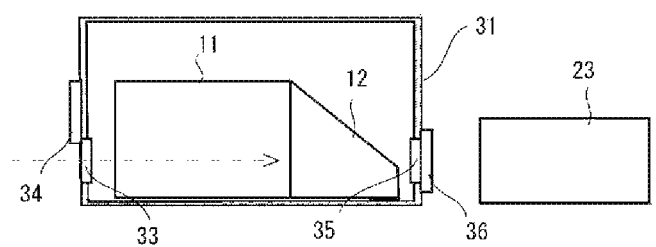

The intake open-close member 34 is integrally attached to the casing 31 outside the intake opening 33 of the casing 31. FIGS. 3A and D illustrate the intake open-close member 34 moved down. In this state, the intake opening 33 of the casing 31 is closed. In FIG. 3A, the casing 31 is sealed, and the space inside the casing 31 can be isolated from the outside. FIGS. 3B and C illustrate the intake open-close member 34 moved up. In this state, the intake opening 33 of the casing 31 is open. The intake opening 33 allows the communication between the inside and the outside of the casing 31. In this way, the intake open-close member 34 is attached to the outer surface of the casing 31 and configured to move up with respect to the intake opening 33 of the casing 31. Accordingly, the intake open-close member 34 does not protrude downward from the casing 31. As illustrated in FIG. 1, the intake open-close member 34 is provided not to protrude downward from the pair of front beams 5 of the vehicle body 2.

As illustrated in FIGS. 3A-3D, the exhaust opening 35 is formed in the back surface of the casing 31. Accordingly, the exhaust opening 35 is provided between the engine body 11 and the battery module 23. When the exhaust opening 35 is open, the air in the casing 31 can be discharged to the battery module 23.

Figure 3C:
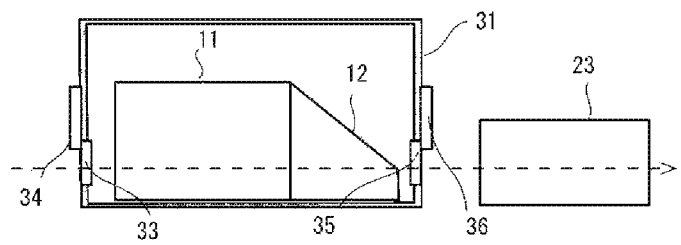
Figure 3D:
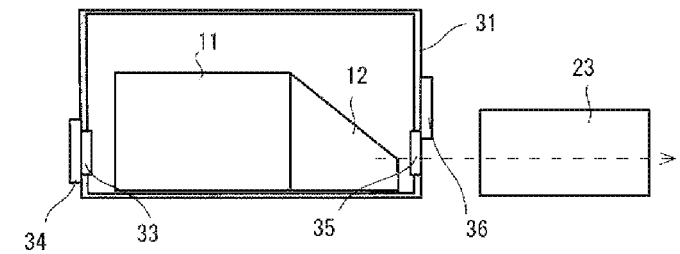

The exhaust open-close member 36 is integrally attached to the casing 31 outside the exhaust opening 35 of the casing 31. FIGS. 3A and B illustrate the exhaust open-close member 36 moved down. In this state, the exhaust opening 35 of the casing 31 is closed. FIGS. 3C and B illustrate the exhaust open-close member 36 moved up. In this case, the exhaust opening 35 of the casing 31 is open. In this way, the exhaust open-close member 36 is attached to the outer surface of the casing 31 and configured to move up with respect to the exhaust opening 35 of the casing 31. Accordingly, the exhaust open-close member 36 does not protrude downward from the casing 31.

The external temperature sensor 37 is provided outside and in front of the casing 31 to detect the temperature of the outside of the casing 31.

The internal temperature sensor 38 is provided inside the casing 31 to detect the temperature of the inside of the casing 31. Here, the internal temperature sensor 38 is provided to contact the outer surface of the engine body 11. Accordingly, the internal temperature sensor 38 can detect the temperature of the engine body 11 as the temperature of the inside of the casing 31.

The battery temperature sensor 39 is provided in the battery module 23 to detect the temperature of the inside of the battery module 23.

The outer temperature sensor 37, the internal temperature sensor 38, the battery temperature sensor 39, the intake open-close member 34, and the exhaust open-close members 36 are coupled to the controller 40. The controller 40 controls the intake open-close member 34 and the exhaust open-close members 36, and separately controls the opening and closing of openings, such as the intake opening 33 and the exhaust openings 35, based on the correlation among the temperatures detected by the external temperature sensor 37, the internal temperature sensor 38, and the battery temperature sensor 39. The controller 40 may be implemented by, for example, a microcomputer. The controller 40 may be mounted to the casing 31 as a dedicated circuit, or provided as a function of an ECU (engine control unit) that controls the automobile 1.

Figure 4:
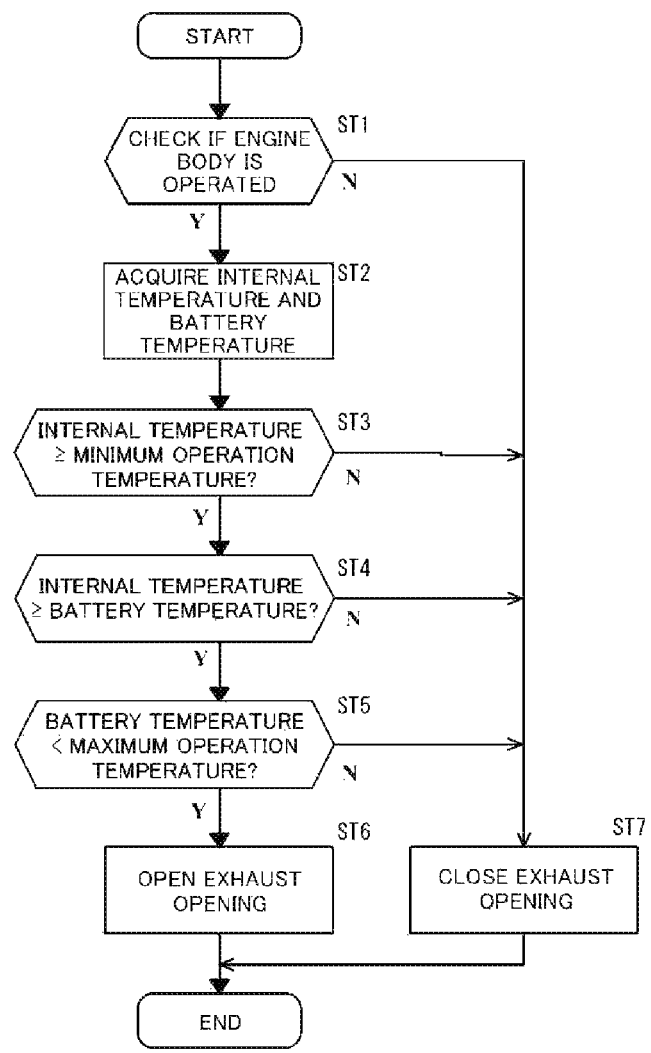
FIG. 4 is a flowchart illustrating a process to control the opening and closing of an exhaust opening performed by the controller illustrated in FIG. 2.

FIG. 4 is a flowchart illustrating a process to control the opening and closing of the exhaust opening 35 performed by the controller 40 illustrated in FIG. 2. The controller 40 repeatedly performs the process to control the opening and closing illustrated in FIG. 4.

In the process illustrated in FIG. 4, the controller 40 first checks if the engine body 11 is operated (step ST1). The controller 40 acquires information on the control of the engine body 11 by the ECU, and checks if the engine body 11 is operated. When the engine body 11 is not operated, that is, the engine body 11 is stopped, the controller 40 closes the exhaust opening 35 (step ST7). In this case, the controller 40 also closes the intake opening 33, so that the casing 31 is sealed. By this means, the inside of the casing 31 is kept warm by a heat-insulation structure.

On the other hand, when the engine body 11 is operated, the controller 40 acquires the external temperature detected by the external temperature sensor 37, the internal temperature detected by the internal temperature sensor 38, and the battery temperature detected by the battery temperature sensor 39 (step ST2). Then, the controller 40 starts a control to open and close the openings separately based on the correlation of those temperatures.

The controller 40 first compares the internal temperature to a minimum operation temperature at which the engine body 11 and so forth need warm-up (step ST3). The minimum operation temperature may be a lowest temperature suitable to operate, for example, the engine body 11 and the transmission 12. To be more specific, the minimum operation temperature may be a temperature at which the viscosity of the oil used in the engine body 11 and the transmission 12 is higher than a desired viscosity suitable to operate the engine body 11 and the transmission 12. When the internal temperature is lower than the minimum operation temperature, the controller 40 closes the exhaust openings 35 (step ST7). In this case, the controller 40 also closes the intake opening 33, so that the casing 31 is sealed. By this means, the inside of the casing 31 is kept warm by the heat-insulation structure.

Meanwhile, when the internal temperature is equal to or higher than the minimum operation temperature, the controller 40 compares the internal temperature to the battery temperature (step ST4). When the internal temperature is lower than the battery temperature, the controller 40 closes the exhaust openings 35 (step ST7). In this case, the controller 40 also closes the intake opening 33, so that the casing 31 is sealed. By this means, the inside of the casing 31 is kept warm by the heat-insulation structure.

When the internal temperature is equal to or higher than the battery temperature, the controller 40 compares the battery temperature to a maximum operation temperature of the battery (step ST5). The maximum operation temperature may be a highest temperature at which the characteristics of the battery, such as the lifetime of the battery do not deteriorate. When the battery temperature is equal to or higher than the maximum operation temperature, the controller 40 closes the exhaust openings 35 (step ST7).

On the other hand, when the battery temperature is lower than the maximum operation temperature, the controller 40 opens the exhaust openings 35 (step ST6). By this means, the air warmed by the heat of the engine body 11 and so forth in the casing 31 moves back from the exhaust openings 35. By this means, the battery modules 23 provided behind the exhaust opening 35 are warmed.

As described above, with the present example, the casing 31 of the capsule apparatus 30 encloses at least the engine body 11 of the automobile 1 including the power unit while providing an air layer around the engine body 11. It makes it difficult to change the temperature of the engine body 11 in the casing 31 of the capsule apparatus 30. In addition, the exhaust openings 35 which are opened and closed by the exhaust open-close members 36 to discharge and stop discharging the air are provided in the back part of the capsule apparatus 30, and at least the battery modules 23 are provided behind the capsule apparatus 30. Therefore, for example, the controller 40 controls the exhaust open-close members 36 to open the exhaust openings 35 depending on the state of the automobile 1, and consequently it is possible to supply the air efficiently warmed by the heat of the engine body 11 and so forth in the capsule apparatus 30 to the battery modules 23. In this way, with the present example, it is possible to efficiently warm the engine body 11 in the capsule apparatus 30, and supply the warmed air in the capsule apparatus 30 to the battery modules 23. As a result, it is possible to promptly improve the performance of the power unit in practical use.

With the present example, the controller 40 controls the exhaust open-close members 36, based on the correlation between the internal temperature which is the temperature of the inside of the capsule apparatus 30 or the temperature of the engine body 11 and the battery temperature of the battery modules 23 disposed outside the capsule apparatus 30. By this means, it is possible to separately control, for example, the temperature of the engine body 11 and the temperature of the battery by controlling the opening and closing of the exhaust opening 35.

For example, when the automobile 1 or the power unit is stopped, the controller 40 controls the exhaust open-close members 36 to close the exhaust openings 35. By this means, it is possible to seal the capsule apparatus 30 to prevent the engine body 11 and so forth from being cooled when the automobile 1 or the engine body 11 is stopped.

In addition, the internal temperature may be low, for example, just after the cooled engine body 11 is started. To address this, the exhaust openings 35 are closed to seal the capsule apparatus 30, so that it is possible to promptly warm the engine body 11 and so forth.

Moreover, for example, when the temperature of the engine body 11 is equal to or higher than the minimum operation temperature suitable to operate the engine body 11, the controller 40 controls the exhaust open-close members 36 to open the exhaust openings 35. By this means, it is possible to supply the air warmed in the capsule apparatus 30 to the cooled battery modules 23.

Furthermore, for example, the controller 40 compares the internal temperature of the capsule apparatus 30 or the temperature of the engine body 11 which is equal to or higher than the minimum operation temperature to the battery temperature of the battery modules 23 disposed outside the capsule apparatus 30, and controls the exhaust open-close members 36 to open the exhaust openings 35 when the battery temperature is lower than the internal temperature. By this means, it is possible to supply the air efficiently warmed in the capsule apparatus 30 to the cooled battery modules 23. Therefore, the cooled battery modules 23 are likely to be promptly warmed without deteriorating the warm-up performance of the engine body 11.

Furthermore, for example, when the battery temperature of the battery modules 23 disposed outside the capsule apparatus 30 is higher than the maximum operation temperature suitable for the operation, the controller 40 controls the exhaust open-close members 36 to close the exhaust openings 35. By this means, it is possible to prevent the battery modules 23 disposed outside the capsule apparatus 30 from being overheated to a temperature higher than the maximum operation temperature suitable for the operation. It is possible to control the operation temperature of the battery modules 23 to fall within a predetermined range, and therefore to exert the normal performance of the battery modules 23.

With the present example, the exhaust open-close members 36 are integrally attached to casing 31 of the capsule apparatus 30. Accordingly, there is no need to mount the exhaust open-close members 36 to the framework member or the structural member of the automobile 1 to support the exhaust open-close members 36 because the exhaust open-close members 36 are integrally attached to casing 31 of the capsule apparatus 30. By this means, it is possible to simplify the structure of the capsule apparatus 30.

With the present example, the capsule apparatus 30 is constituted by the casing 31 enclosing at least the engine body 11 in the front compartment 3 of the automobile 1. The engine body 11 is placed on the casing 31, and the casing 31 and the engine body 11 are mounted to and supported by the framework member or the structural member of the automobile 1 at the same positions. Therefore, there is no need to mount the components of the capsule apparatus 30 to the framework member or the structural member of the automobile 1 because the casing 31 of the capsule structure with the power unit such as the engine body 11 are mounted to the framework member or the structural member of the automobile 1. Accordingly, for example, compared to a case where the capsule apparatus 30 is constituted by casings such as an engine cover and a bottom cover which are individually mounted to the framework member or the structural member of the automobile 1, there is no need to add a complicated process or make a significant change to mount the capsule apparatus 30 to the automobile 1. In addition, it is possible to form the capsule apparatus 30 in a minimum size, and therefore to manufacture the capsule apparatus 30 at low cost. Moreover, the open-close members such as the exhaust open-close members 36 of the capsule apparatus 30 are movable to fall inside the framework member or the structural member of the automobile 1. By this means, it is possible to provide the capsule apparatus 30 in the automobile 1 without a significant impact on the specification of the automobile 1, such as the minimum ground clearance of the vehicle body 2.

While the above-described examples are preferred examples of the present invention, it is to be understood that the invention is not limited to these examples. The present invention is intended to cover various modification and alteration without departing from the spirit and scope of the present invention.

Figure 5:
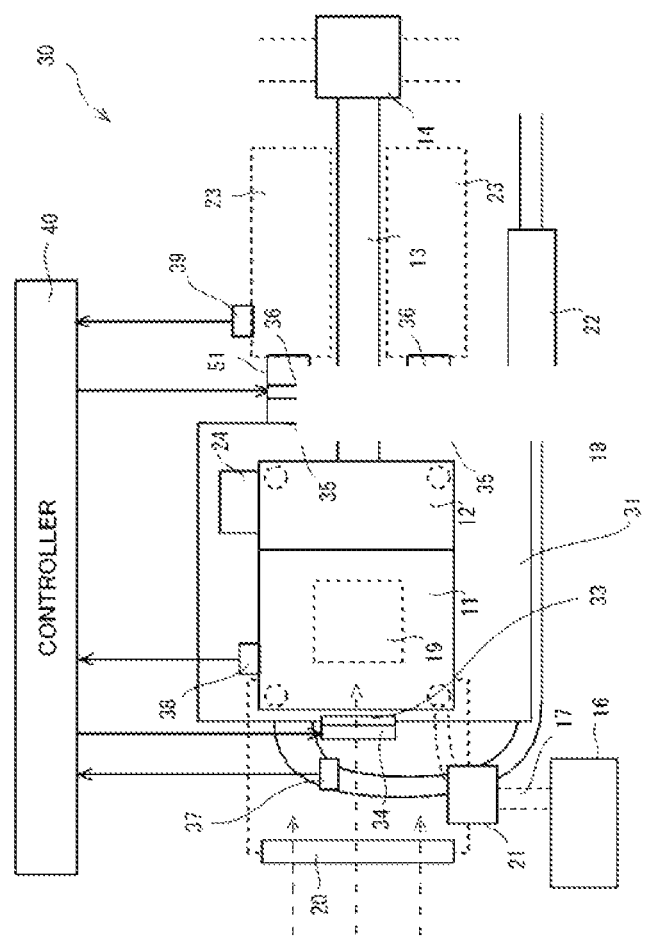
FIG. 5 illustrates a modification of the capsule apparatus illustrated in FIG. 2.

FIG. 5 illustrates a modification of the capsule apparatus 30 illustrated in FIG. 2. In FIG. 5, an air duct 51 is provided to extend from the capsule apparatus 30 to the vicinity of each of the battery modules 23 disposed outside the capsule apparatus 30. By this means, it is possible to supply the air discharged from the capsule apparatus 30 directly to the battery modules 23 disposed outside the capsule apparatus 30, and therefore to efficiently warm the battery modules 23. In this case, the exhaust open-close members 36 may be provided in the air ducts 51, respectively.

With the above-described example, the motor 24 is provided in the casing 31 and attached to the transmission 12. Alternatively, the motor 24 may be provided outside the casing 31. In this case, the motor 24 is provided to protrude from the back part of the casing 31, and therefore can be warmed by the air discharged from the casing 31.

The invention claimed is:
1. A vehicle with a capsule structure of a power unit, the power unit comprising:
an internal combustion engine configured to combust air-fuel mixture in an engine body and output a driving force; and
a motor configured to output a driving force by using electric power of an electric generator or a battery,
wherein at least the engine body is enclosed by the capsule structure, and at least the battery is disposed behind the capsule structure,
the capsule structure comprising:
an exhaust opening provided in a back part of the capsule structure;
an exhaust open-close member configured to open and close the exhaust opening to discharge and stop discharging air from the exhaust opening; and
a controller configured to control the exhaust open-close member to open and close the exhaust opening,
wherein when closing the exhaust opening, the exhaust open-close member overlays the exhaust opening, wherein the controller controls the exhaust open-close member to close the exhaust opening so that the capsule structure is sealed, when the vehicle or the power unit is stopped.

2. The vehicle with a capsule structure of a power unit according to claim 1, wherein the controller controls the exhaust open-close member on a basis of a first temperature which is a temperature of the inside of the capsule structure or a temperature of the engine body and a second temperature which is a temperature of the battery or the motor disposed outside the capsule structure.

3. The vehicle with a capsule structure of a power unit according to claim 1, wherein the controller controls the exhaust open-close member to close the exhaust opening when a first temperature which is a temperature of the inside of the capsule structure or a temperature of the engine body is lower than a minimum operation temperature suitable for operation of the engine body.

4. The vehicle with a capsule structure of a power unit according to claim 1, wherein the controller controls the exhaust open-close member to open the exhaust opening when a first temperature which is a temperature of the inside of the capsule structure or a temperature of the engine body is equal to or higher than a minimum operation temperature suitable for operation of the engine body.

5. The vehicle with a capsule structure of a power unit according to claim 1, wherein the controller compares a first temperature which is a temperature of the inside of the capsule structure or a temperature of the engine body to a second temperature which is a temperature of the battery or the motor disposed outside the capsule structure, and controls the exhaust open-close member to open the exhaust opening when the second temperature is lower than the first temperature.

6. The vehicle with a capsule structure of a power unit according to claim 1, wherein the controller controls the exhaust open-close member to close the exhaust opening, when a second temperature which is a temperature of the battery or the motor disposed outside the capsule structure is higher than a maximum operation temperature suitable for operation.

7. The vehicle with a capsule structure of a power unit according to claim 1, wherein the capsule structure further comprises a vent member extending from the capsule structure to a vicinity of at least one of the battery and the motor disposed outside the capsule structure.

8. The vehicle with a capsule structure of a power unit according to claim 7, wherein the exhaust open-close member is provided in the vent member.

9. The vehicle with a capsule structure of a power unit according to claim 1, wherein the exhaust open-close member is integrally attached to a casing of the capsule structure.

10. The vehicle with a capsule structure of a power unit according to claim 1, wherein:
the capsule structure includes a casing configured to enclose at least the engine body in the vehicle; and
the casing and the engine body are mounted to and supported by a framework member or a structural member of the vehicle.

11. The vehicle with a capsule structure of a power unit according to claim 1, wherein the exhaust open-close member disposed outside the capsule structure opens and closes within a framework member or a structural member of the vehicle.

12. The vehicle with a capsule structure of a power unit according to claim 1, wherein the capsule structure encloses components including at least the engine body which are lubricated with oil in the vehicle.

13. The vehicle with a capsule structure of a power unit according to claim 1, wherein an exhaust pipe, a turbomachinery, a muffler, and a catalytic machinery of the power unit are provided outside the capsule structure.

14. The vehicle with a capsule structure of a power unit according to claim 1, wherein:
the engine body, an engine accessory, a transmission, and a hybrid automobile component are provided in the vehicle; and
the capsule structure encloses at least the engine body.

15. The vehicle with a capsule structure of a power unit according to claim 1, wherein the capsule structure further comprises:
an intake opening provided in a front part of the capsule structure; and
an intake open-close member configured to open and close the intake opening to intake and stop intaking air from the intake opening,
wherein the controller controls the intake open-close member to open and close the intake opening.

16. A vehicle with a capsule structure of a power unit, the power unit comprising:
an internal combustion engine configured to combust air-fuel mixture in an engine body and output a driving force; and
a motor configured to output a driving force by using electric power of an electric generator or a battery,
wherein at least the engine body is enclosed by the capsule structure, and at least the battery is disposed behind the capsule structure,
the capsule structure comprising:
an exhaust opening provided in a back part of the capsule structure;
an exhaust open-close member configured to open and close the exhaust opening to discharge and stop discharging air from the exhaust opening; and
circuitry configured to control the exhaust open-close member to open and close the exhaust opening,
wherein the circuitry controls the exhaust open-close member to close the exhaust opening so that the capsule structure is sealed, when the vehicle or the power unit is stopped.

17. The vehicle with a capsule structure of a power unit according to claim 15, wherein the controller controls the exhaust open-close member to close the exhaust opening, and controls the intake open-close member to close the intake opening so that the capsule structure is sealed, when the vehicle or the power unit is stopped.

18. The vehicle with a capsule structure of a power unit according to claim 15, wherein the controller controls the exhaust open-close member to close the exhaust opening, and controls the intake open-close member to close the intake opening when a first temperature which is a temperature of the inside of the capsule structure or a temperature of the engine body is lower than a minimum operation temperature suitable for operation of the engine body.

* * * * *